US006915076B1

(12) United States Patent
Mittal et al.

(10) Patent No.: US 6,915,076 B1
(45) Date of Patent: Jul. 5, 2005

(54) SYSTEM AND METHOD FOR ADAPTIVELY SELECTING A SIGNAL THRESHOLD OF AN OPTICAL LINK

(75) Inventors: Rohit Mittal, Sunnyvale, CA (US); Chris Kennedy, Milpitas, CA (US)

(73) Assignee: CIENA Corporation, Linthicum, MS (US)

( * ) Notice: Subject to any disclaimer, the term of this patent is extended or adjusted under 35 U.S.C. 154(b) by 363 days.

(21) Appl. No.: 09/855,319

(22) Filed: May 14, 2001

(51) Int. Cl.[7] .............................................. H04B 17/00
(52) U.S. Cl. ............................. 398/38; 398/27; 398/37; 398/26; 398/210; 375/317; 375/318; 375/346
(58) Field of Search ............................. 398/37, 38, 27, 398/210; 375/317, 318, 346

(56) References Cited

U.S. PATENT DOCUMENTS

| | | | | |
|---|---|---|---|---|
| 5,894,362 | A | * | 4/1999 | Onaka et al. .................. 398/95 |
| 6,038,049 | A | * | 3/2000 | Shimizu et al. ............. 398/210 |
| 6,118,829 | A | * | 9/2000 | North ......................... 375/317 |
| 6,178,025 | B1 | * | 1/2001 | Hardcastle et al. ........... 398/17 |
| 6,359,941 | B1 | * | 3/2002 | den Bakker ................ 375/317 |
| 6,473,212 | B1 | * | 10/2002 | Chraplyvy et al. ............ 398/79 |

OTHER PUBLICATIONS

Wirbel, Loring. *Conexant preps 10–Gbit/s optical components*. EE Times, Feb. 14, 2000. [retrieved on Aug. 17, 2001]. Retrieved from the internet: <URL:http://www.google.com/search?q=cache:Hb7N3OGBwtw:www.eetime.>.

Mindspeed Technologies. Data Sheet—CX60083–15 *10 Gbps High Gain Limiting Amplifier*. Rev. v4b, May 4, 2001, pp. 1–12.

* cited by examiner

*Primary Examiner*—Leslie Pascal
*Assistant Examiner*—Chau M. Nguyen

(57) ABSTRACT

An apparatus and method for detecting a signal in an optical data network is disclosed. A peak power level and an average power level are measured for an optical input to an optical detector. A threshold power level is associated with each average power level that is sufficient to distinguish a data signal form optical noise at the average power level. A signal is detected if the measured peak power level exceeds the threshold power level appropriate for the average power level. In one embodiment, a threshold value of a ratio of the peak power level to the average power level is calculated and a signal is detected if the ratio of the measured peak power level to the average power exceeds the threshold value.

60 Claims, 10 Drawing Sheets

SYSTEM AND METHOD FOR ADAPTIVELY SELECTING A SIGNAL THRESHOLD OF AN OPTICAL LINK

BACKGROUND OF THE INVENTION

1. Field of the Invention

The present invention relates generally to determining a signal detection threshold for optical signals in an optical network. More particularly, the present invention is directed towards adjusting an optical signal detection threshold appropriately for different network conditions.

2. Description of Background Art

Optical data networks typically include two or more optical nodes linked by optical fibers into a network. Each node may include one or more optical transmitters, optical receivers, optical amplifiers, and optical multiplexors along with one or more node controllers. The network may be one of several common topologies, such as a linear chain network, an optical mesh network, or an optical ring network.

Typically, the optical network is designed using a power budget analysis of the optical path. In a power budget analysis, the optical power at the receiver and its signal-to-noise ratio must be sufficiently large to achieve a desired bit error rate (BER). This can be expressed mathematically as: $l_m > P_t(dBm) - P_{losses}(dBm)$, where $l_m$ is a margin required to achieve a BER given the electrical and optical noise at the receiver, $P_t$ is a transmitted power, and $P_{losses}$ are the net optical losses along the portion of the optical path from the optical transmitter to the receiver, which includes the optical attenuation of passive optical fibers and components offset by the amplification of any optical amplifiers along the optical path. The use of optical amplifiers along the optical path (including pre-amplifiers and post-amplifiers) reduces the effective optical losses but also injects optical noise.

Each receiver within an optical node typically includes at least one optical detector (also commonly known as a "photodetector") for recovering the data stream of a data channel. Additional photodetectors may be included in an optical node to perform a monitoring function of one or more data channels. For example, dense wavelength division multiplexing (DWDM) nodes may include an optical receiver for each wavelength channel coupled to a tributary network along with additional optical detectors for monitoring the behavior of two or more wavelength channels communicated with a neighboring node.

One way that an optical detector is used to monitor an optical input is known as a "signal detect" function. FIG. 1 is a block diagram of a conventional optical receiver 100 having a photodetector 120, front-end electrical amplifier 130, and decision circuit 140. An optical pre-amplifier 110 may be coupled to optical receiver 100. Decision circuit 140 is used to recover an optical data stream. Additionally, front-end amplifier 130 may include a peak-detector 135. The output of peak-detector 135 is used to provide a signal detect (SD) output. The SD output is typically a logical "1" if the measured peak optical power level exceeds a pre-selected signal detect threshold power level and a logical "0" otherwise.

The SD output is often used as part of a fault detection and restoration system that monitors potential faults in the optical network and initiates restoration events in the event of a fault, such as switching to redundant electrical components or performing a line switch to a protect fiber. If the SD output is used for fault detection and restoration, it is important to avoid network conditions that could result in an erroneous SD output.

A conventional front-end amplifier 130 with a peak-detect circuit 135 provides a comparatively inexpensive circuit to provide a SD output. However, a drawback of receiver 100 is that the SD output will only be reliable if the optical signal and optical noise levels remain within specific ranges with respect to the threshold peak power level. In particular, the operation of the network is constrained to a set of conditions corresponding to: 1) preventing the received peak optical power level of data signals from dropping below the signal detect threshold power level for all possible optical attenuation levels; and 2) preventing the received peak optical power level of noise level for a loss-of-signal condition from rising above the signal detect threshold power level for all possible optical attenuation levels. These conditions, in turn, may require costly field calibrations of the signal detect threshold power level or impose undesirable limitations on network design and operation.

Therefore, there is a need for a new system and method of signal detection in an optical network.

SUMMARY OF THE INVENTION

An optical signal detection method and apparatus is disclosed for an optical network in which an optical path link may have a range of optical attenuation that affects the power characteristics of an optical input received by an optical detection circuit in one optical node coupled by the optical path link to a neighboring upstream optical node. The signal detection threshold is selected to be sufficient to distinguish optical data signals from optical noise over the range of optical attenuation. One embodiment of an optical detection method of the present invention includes: receiving a signal indicative of an average power level of an optical input, receiving a signal indicative of a peak power level of the optical input, and selecting a threshold peak power level greater than a peak power level of optical noise having the measured average power level and less than a peak power level of optical data pulses having the measured average power level. In one embodiment, an output signal is generated having a first value responsive to the measured peak power level being greater than the threshold peak power level and a second value responsive to the measured peak power level being less than the threshold peak power level.

In one embodiment, selecting the threshold peak power level includes: selecting a range of attenuation for the optical path link between a minimum attenuation and a maximum attenuation; characterizing the average power level and the peak power level of optical noise over the range of attenuation; and characterizing the average power level and the peak power level of optical data pulses over the range of attenuation. In one embodiment, the average power level and the peak power level are characterized for both optical noise and optical data pulses using an empirical technique. In one embodiment a variable attenuator is coupled between the optical detection circuit and optical transmitter with at least one optical amplifier disposed between the optical detection circuit and the optical transmitter. In a test mode, measurements are made of the peak power level and average power level of optical noise over a range of attenuation with the transmitter in a quiescent state. Measurements are also made of the peak power level and average power level of optical data pulses over the same range of attenuation with the transmitter turned on. The data collected during the test mode may then be used to select the threshold peak power level during an operational mode.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

Figure 1:
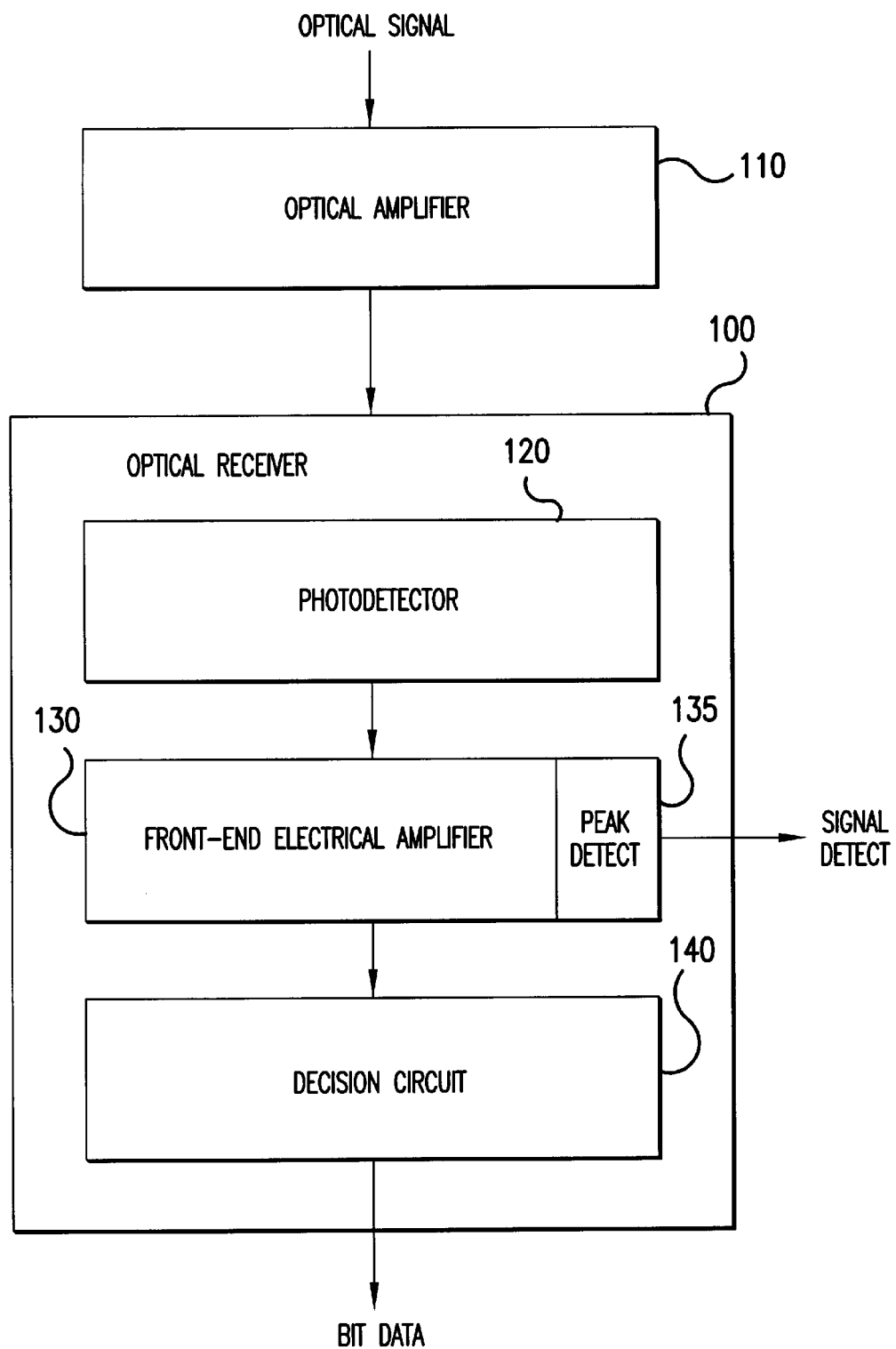
FIG. 1 is a block diagram of a prior art optical receiver.
Figure 2A:
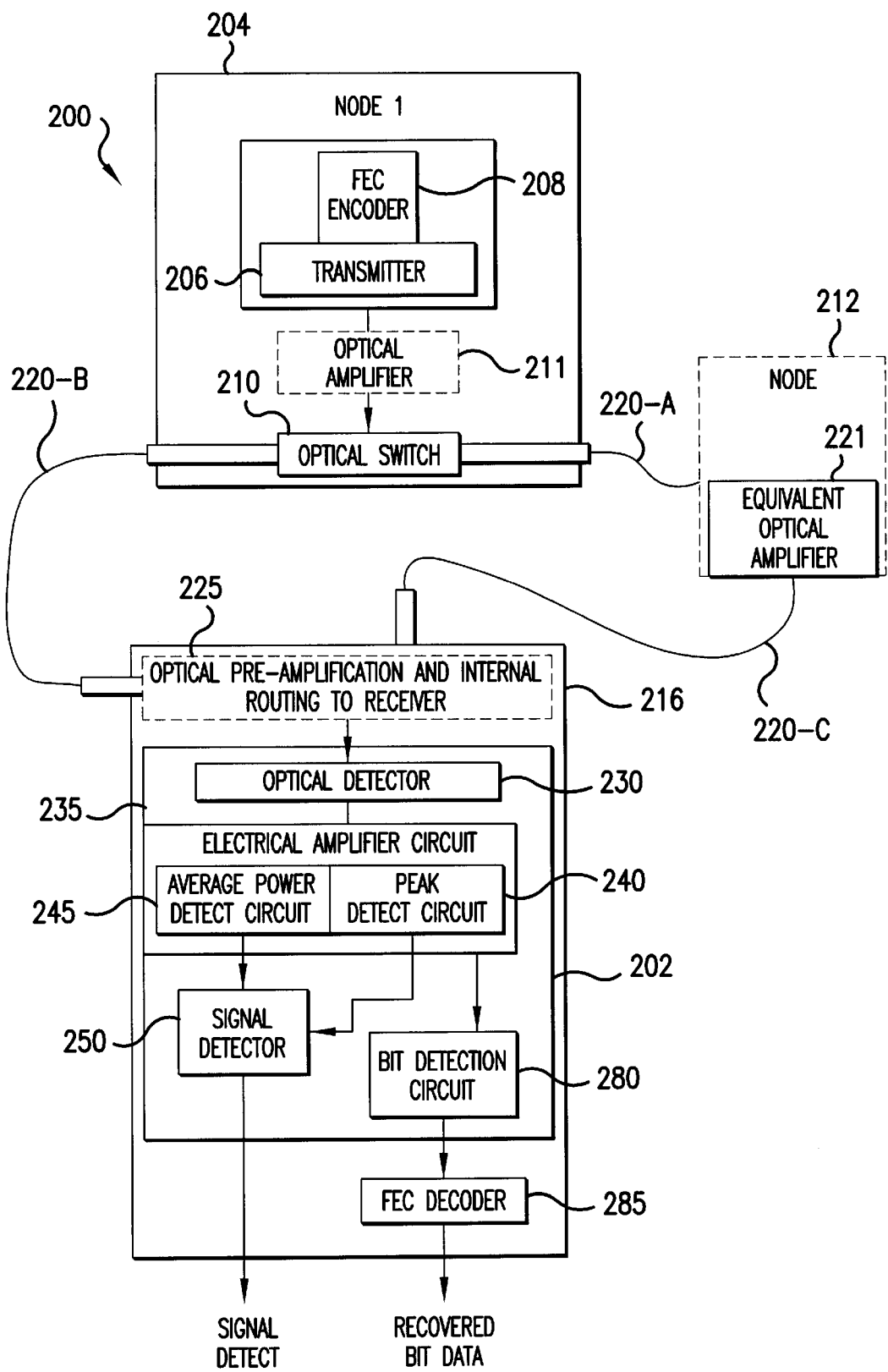
FIG. 2A is a block diagram of an optical network having an optical node with an optical detection circuit in accord with the present invention.

The present invention generally includes a system and method for adjusting an optical signal detection threshold of an optical detection circuit in an optical network. FIG. 2A is a block diagram of one embodiment of an optical receiver 202 of the present invention used in an optical network 200. For the purposes of illustration, many conventional node elements are omitted for clarity.

Optical network 200 is designed to communicate a data stream along an optical path originating from an optical transmitter 206 in one node 204 to an optical detector of an intended receiver 202 in another node 216. The optical path is thus the end-to-end signal route that includes all of the optical nodes and optical fibers from the originating transmitter 206 to a detector in the receiving node 216. At each intermediate node along the optical path, an individual data channel may be regenerated, i.e. converted from optical pulses into electric signals and back into optical pulses. However, it is increasingly common to include one or more optical amplifiers within intermediate optical nodes to permit optical pass-through.

Referring again to FIG. 2A, an optical signal comprising a data stream of optical data pulses is generated in a first node 204 using an optical transmitter 206. First node 204 may include an optical post-amplifier 211 to amplify the optical data pulses. The data stream may be encoded with a forward error correction (FEC) code with a conventional FEC encoder 208 to reduce the signal-to-noise ratio required to detect bits with a desired bit error rate (BER).

An optical switch 210 may be included in first node 204 to switch from a working optical fiber 220-A to a protection optical fiber 220-B in the event of a line fault. An intermediate node 212 may either regenerate an optical signal or, in some cases, provide sufficient amplification to pass an optical data signal on to a downstream node. Consequently, an intermediate node 212, shown with dashed lines, may optionally be included in the optical path of receiving node 216, with the intermediate node including one or more optical amplifiers to amplify the optical signal upstream of the receiving node 216. It will be understood that while an optical node may include more than one optical amplifier such that an equivalent optical amplifier 211 may be used to represent the cumulative effect of all of the optical amplifiers that amplify an optical data stream.

The optical path of a data channel may be further divided into portions of the optical path corresponding to point-to-point links between nearest-neighbor nodes along the optical path, which can be described as "optical path links." The optical path link between two nodes includes the optical fiber coupling the nodes. This portion of the optical path link is sometimes called a "fiber link." A more precise analysis of the optical path link from an optical amplifier in one node to an optical detector in another node would also include the optical path of the data channel within each node. However, in many applications the internal intra-node optical attenuation (e.g., between the input port of the receiving node and an optical detector in the receiving node or between the optical amplifier and the output port of the upstream node) is small compared to the optical attenuation of the fiber link between the nodes such that the attenuation of the optical path link is primarily the attenuation of the optical fiber link between the receiving node and the upstream node.

Figure 2B:
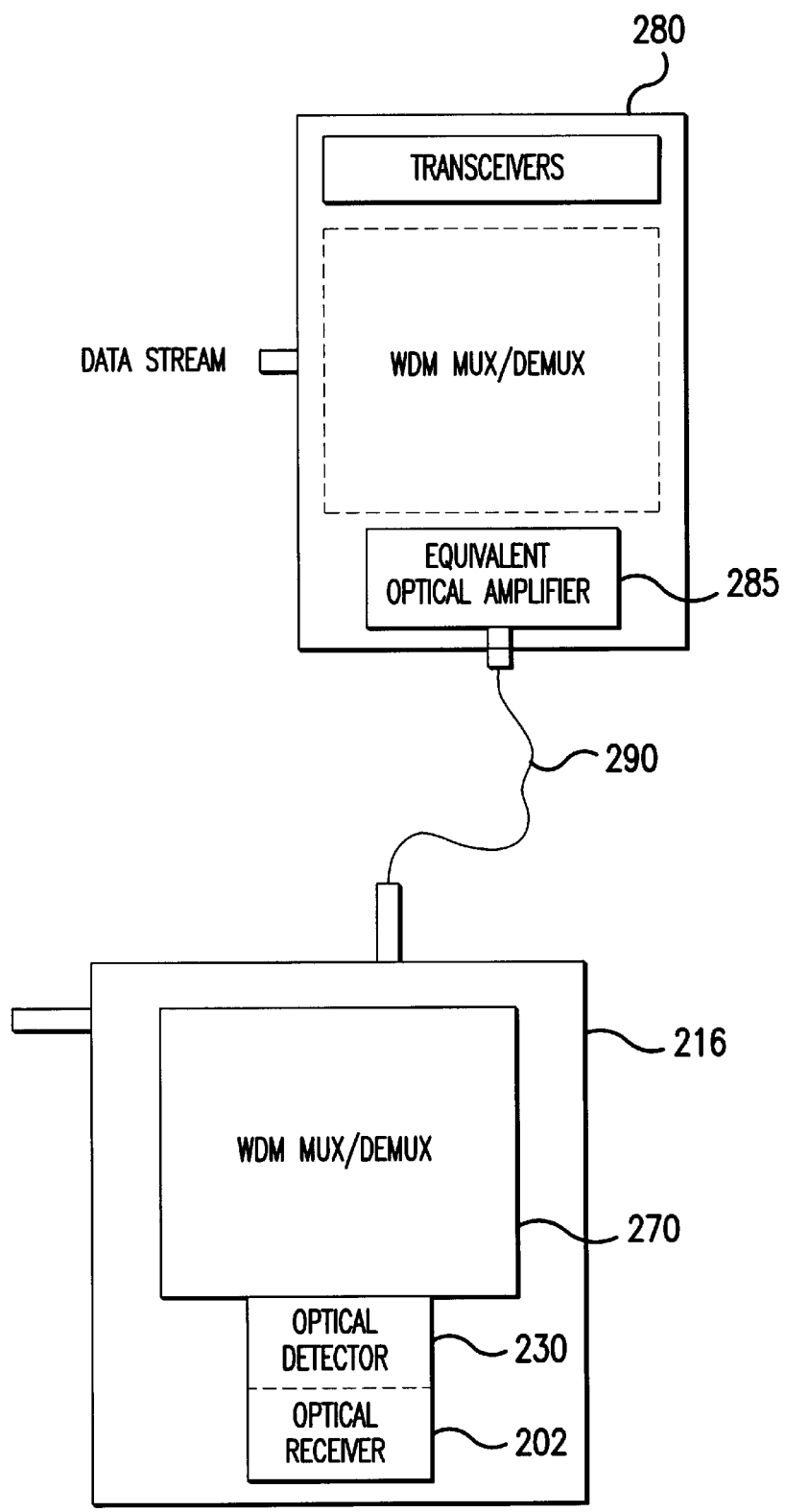
FIG. 2B is an illustrative block diagram of an embodiment of a receiving node coupled to a neighboring upstream node by an optical fiber.

FIG. 2B is an illustrative block diagram of an optical path link for a data channel of a wavelength division multiplexed network. An input port of receiving node 216 is coupled to an output port of neighboring upstream optical node 280 by an optical fiber 290. Receiving node 216 may include optical elements, such as multiplexing/demultiplexing elements, to select an individual channel for optical receiver 202. Upstream node 280 may include optical elements to select an individual data channel for amplification. The upstream node 280 has an optical amplifier 285 to optically amplify a data stream of optical data pulses. The data stream of optical pulses may corresponding to optical data pulses generated/regenerated at node 280 or a data stream passed through from an optical data stream received from another node (not shown in FIG. 2B). An equivalent optical amplifier 285 may be used to represent the effect of all of the optical amplification elements in node 280. The optical path link between optical receiver 202 in node 216 and optical amplifier 285 in node 280 includes the optical fiber 290 coupling the nodes. Increasing the length of optical fiber 290 increases the optical attenuation of the optical path link.

During a normal mode of operation, optical detector 230 in receiving node 216 will receive an optical input via optical fiber 290 from upstream node 280 that comprises an optical data stream. The optical data stream is amplified by an optical amplifier 285 in upstream node 280. During normal operation the optical noise of the output of optical amplifier 285 is at a power level much lower than that of the optical data pulses of the optical data stream output from node 280. For example, erbium doped fiber amplifiers generate significant optical noise but which is typically at a lower power level than the data pulses being amplified. However, for some network conditions, such as an electrical fault or a line fault, the data stream is disrupted prior to optical amplifier 285. For this case, sometimes called a "loss of signal condition," optical detector 230 receives only optical noise from optical amplifier 285.

The optical output of optical amplifier 285 has different characteristics for optical data signals compared with optical noise. One difference is that the optical power level at the output of the optical amplifier is greater for optical data signals compared with optical noise for a loss of signal condition. Another difference is that the output of optical amplifier 285 will have different statistical properties in the time domain for an optical data signal compared with optical noise for a loss-of-signal condition. The instantaneous amplitude of optical noise is a statistical process whereas the instantaneous amplitude of an optical signal will be primarily a sequence of optical pulses. Referring again to FIG. 2B, light generated by optical amplifier 285 traverses an optical path link to optical detector 230 that includes an optical fiber 290. One effect of the optical path link is that the attenuation of the optical path link decreases the number of photons received by optical detector 230 from optical amplifier 285. The power level (average and peak) of the optical input at optical detector 230 will depend not only upon the power level at the output of optical amplifier 285 but also upon the optical attenuation of the optical path link from the upstream optical node 280 to the receiving node 216. Increasing the optical attenuation of the optical path link will reduce the power level of both optical data signals and optical noise for a loss of signal condition. It will be understood that the effective optical attenuation of the optical path link is typically primarily a function of the length of the optical fiber 290 coupling the optical nodes and an optical attenuation constant for optical fiber 290. Thus, the power level of an optical signal or optical noise for a loss of signal condition will be a function of the length of optical fiber 290. Note that a line switch may change the optical path link to an optical path link having another optical fiber with a different attenuation. For example, referring again to FIG. 2A, in the event of a line fault of optical fiber 220-A, optical switch 210 may route data to the receiving node 216 through optical fiber 220-B along an optical path having different optical path links. Additionally, while intra-node attenuation within an optical node is typically small compared to optical fiber link attenuation between nodes, it will be understood that there may be situations in which the intra-node attenuation is a significant part of the attenuation of the optical path link. For example, a defective or improperly operating internal electro-optic component within the receiving node may reduce the strength of an optical input received by optical detector 230.

In accord with the present invention, an optical detection circuit in receiving node 216 is configured to permit reliable signal detection over a range of optical attenuation of the optical path link to an amplifier in a neighboring upstream node. Referring again to FIG. 2A, optical receiver 202 may be coupled to a conventional optical pre-amplifier 225 for amplifying optical signals. An optical detection circuit includes an optical detector 230, an electrical amplifier circuit 235, and a signal detector 250. Optical detector 230 (e.g., a photodetector) generates electrical outputs (e.g., a photocurrent or a photo-voltage) in response to the optical input received by the optical detector. In one embodiment the optical detector is a semiconductor photodetector. An electrical amplifier circuit 235 is coupled to the electrical output(s) of optical detector 230. A bit detection circuit 280 and FEC decoder 285 may be coupled to electrical amplifier circuit 235 to recover the data stream. Electrical amplifier circuit 235 includes a peak-detect circuit 240 to measure a differential voltage signal of optical detector 230 that corresponds to a peak optical power level of the optical input to the optical detector 230. It will be understood that the peak detect circuit 240 preferably determines a peak power level over a time period much greater than an individual optical pulse and that the peak detect circuit 240 may use any conventional method to select a time period over which a peak power level is determined. Methods to convert differential voltages or currents into optical power levels are well known such that it will be understood that the differential voltage signal of peak detect circuit 240 is indicative of a measurement of a peak optical power level of the optical input to the optical detector 230. Electrical amplifiers that include a peak detect function can be obtained from a variety of sources. For example the Conexant cx60083 Post-Amplifier™, manufactured by Conexant Systems, Inc. of Newport Beach, Calif., includes a peak detect circuit along with a clock and data recovery function.

Average power level detect circuit 245 is coupled to electrical amplifier circuit 245 and outputs a signal indicative of a measurement of an average optical power level of the optical input to optical detector 230. For example, in a semiconductor photodiode embodiment the average power level detect circuit 245 may measure a photocurrent. For this embodiment, a resistor is electrically coupled to the photocurrent output of the photodiode, with the resistance-capacitor (RC) value of the circuit selected to filter out high frequency signals, i.e., the RC time constant is selected to be much longer than the pulse length of individual optical data pulses. Thus, it will be understood that the average power level is time-averaged over a time scale that is large compared with the duration of an individual optical pulse.

In one embodiment, a signal detector 250 receives the signals indicative of the average power level and the peak power level signals. Signal detector 250 associates a threshold peak power level with each average power level over a range of average power levels. Since the average power level depends upon the attenuation of the optical path link to the optical amplifier in the upstream neighboring node, this permits signal detector 250 to select a threshold peak power level appropriate for the attenuation of the optical path link. As one example, if the optical attenuation of the optical path link is high, the average power level will be low. For this case, signal detector 250 may select a comparatively low threshold peak power level. As another example, if the optical attenuation of the optical path link is low, the average power level will be comparatively high. For this case, signal detector 250 may select a comparatively high threshold peak power level. In one embodiment, the threshold peak power level is an absolute power level. In another embodiment, the threshold peak power level is calculated as its peak-detect voltage equivalent.

As described below in more detail, the threshold peak power level is selected to be sufficient to distinguish an optical data stream from optical noise at the measured average power level. If the measured peak power level exceeds the threshold peak power level associated with the measured average power level, signal detector 250 outputs a signal indicating that a data stream is present, e.g., outputs a logical "1" for a signal detect condition. However, if the measured peak power level is less than the threshold peak power level, signal detector 250 outputs a signal corresponding to a loss-of-signal condition, e.g., outputs a logical "0"

for a loss-of-signal condition. In one embodiment, a peak power level equal to the threshold peak power level also results in signal detector 250 outputting a signal indicating that a data stream is present. In another embodiment, a peak power level equal to the threshold peak power level results in signal detector 250 outputting a signal indicating a loss-of-signal condition.

In one embodiment signal detector 250 is implemented as a microprocessor controller that determines a threshold peak power level from characterization data stored on a memory coupled to the microprocessor. However, more generally, signal detector 250 may be implemented using a conventional controller having a database, a set of rules, or other criteria for selecting an appropriate threshold peak power level at the average power level along with a means for comparing the measured peak power level with the threshold peak power level. Consequently, it will be understood that the function of signal detector 250 may also be implemented as dedicated hardware, software, firmware, or by other controller configurations known in the art.

The threshold peak power level may be selected at each average power level by determining the characteristics of optical data signals and optical noise over a range of optical attenuation of the optical path link between the optical amplifier in the neighboring upstream node and the optical detector in the receiving node. The range of optical attenuation may be selected to simulate a range of optical fiber lengths likely to be encountered during operation of the optical network. For example, the change in attenuation associated with varying the length of an optical fiber link coupling two nodes may be simulated by simulating the effect of optical path link attenuation between a minimum attenuation and a maximum attenuation. Optical amplifiers, such as erbium doped fiber amplifiers, typically produce optical noise that increases with the desired amplification factor. Consequently, the simulation also preferably includes the effects of optical noise from the equivalent optical amplifier in the upstream node. Additionally, the effects of optical pre-amplifiers within the receiving node are also preferably simulated.

Figure 3A:
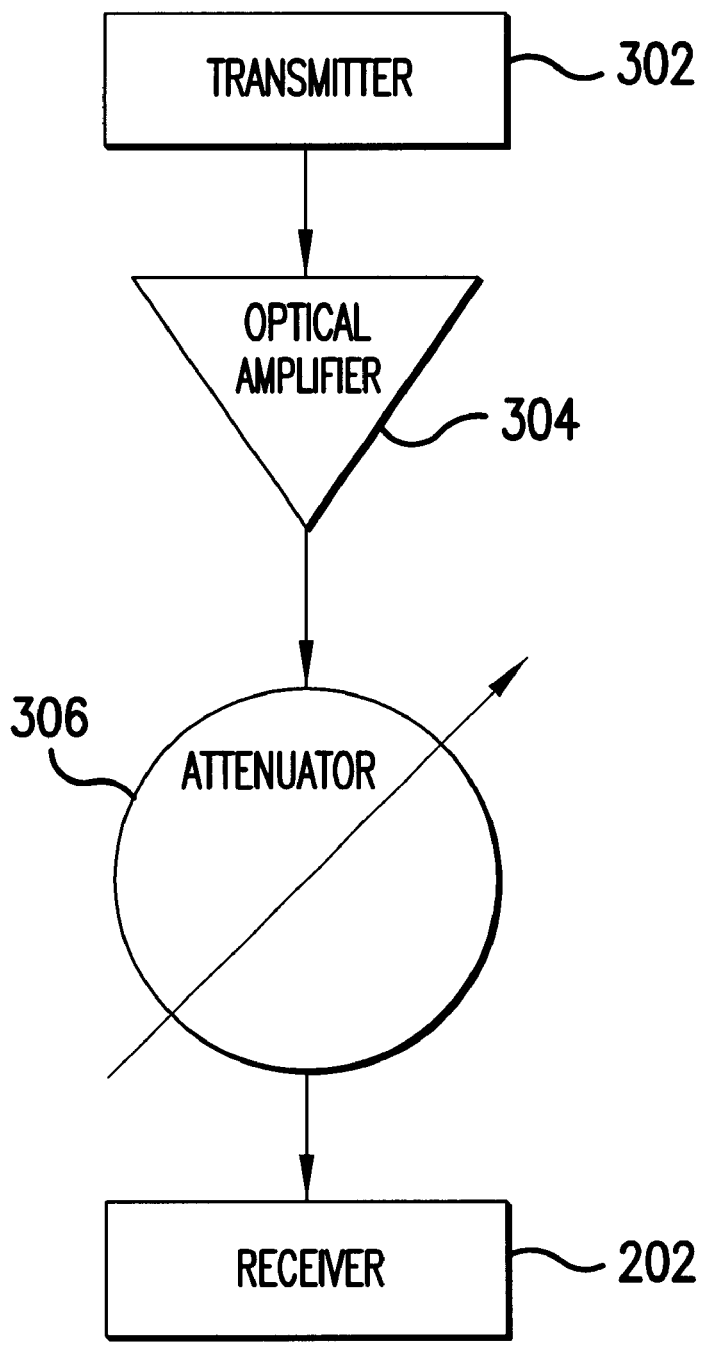
FIG. 3A illustrates a test apparatus for characterizing optical signals and optical noise.

One method for calculating the value of the threshold peak power level required at a particular average power level is to use an experimental apparatus to simulate the effect optical amplification and attenuation has on an optical input to an optical receiver 202. FIG. 3A shows a test apparatus having an optical test transmitter 302 for generating pulses, an optical amplifier 304 (e.g., an erbium doped fiber amplifier) to amplify the pulses, a variable optical attenuator 306 to simulate the effects of a variable fiber length or other source of attenuation along the optical path link, and an optical receiver 202 having an optical detector with an electrical amplifier circuit producing signals indicative of a peak power level and an average power level of an optical input to the receiver.

Figure 3B:
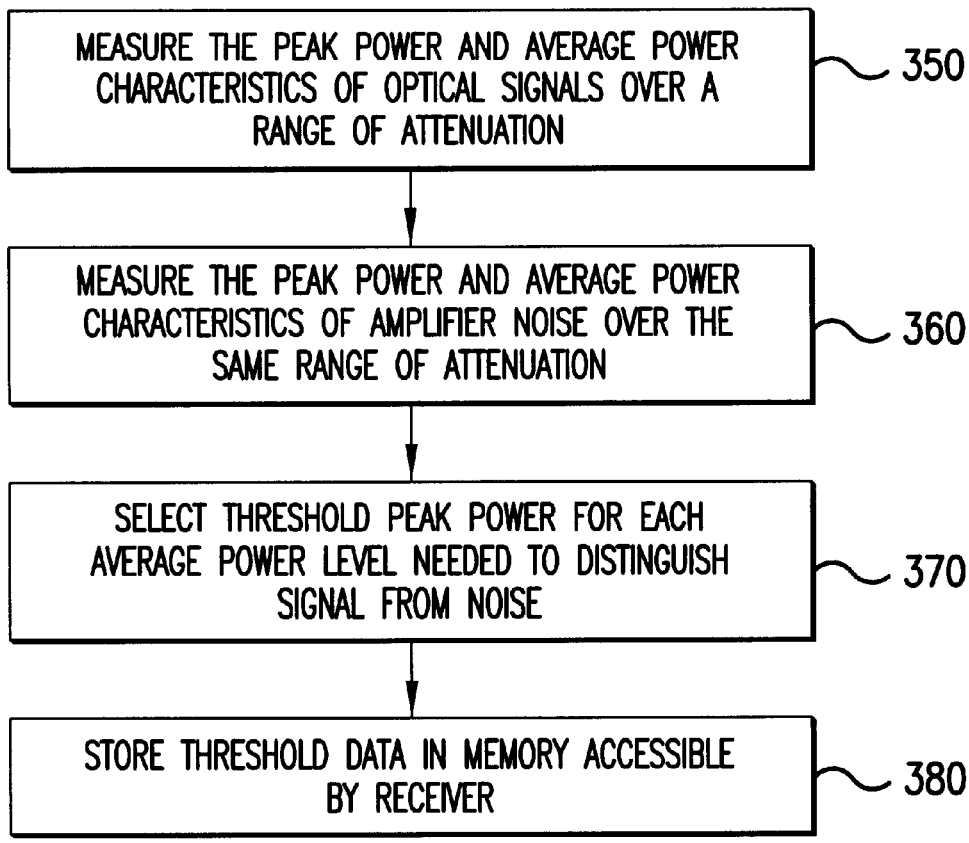
FIG. 3B is a flow chart illustrating a method of selecting a threshold peak power level appropriate for each average power level.
Figure 3C:
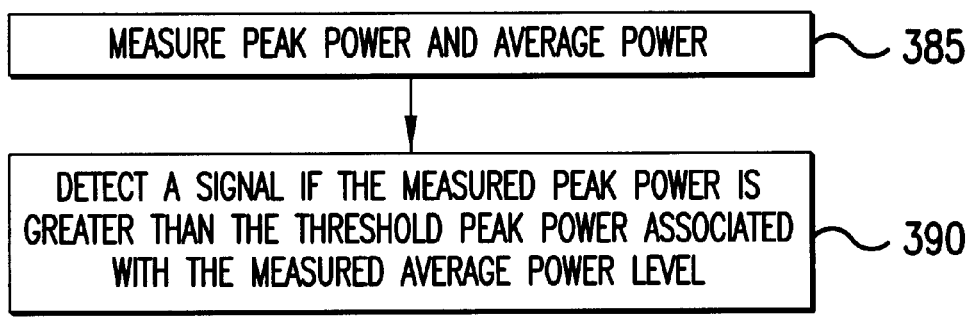
FIG. 3C is a flowchart illustrating a method of using the peak-detection threshold of FIG. 3B in an optical network.

The data calibration includes two test modes. As indicated in the flow chart of FIG. 3B, in a first test mode, a simulated data stream is generated by optical transmitter 302 and signals indicative of the peak power level and average power level are measured 350. In a second test mode, transmitter 302 is turned off and signals indicative of the peak power level and the average power level of optical noise are measured 360. As described below in more detail, the difference in the peak power characteristics of optical signal and optical noise at a particular average power level may be used to select a threshold peak power level 370 that distinguishes an optical signal from optical noise at the measured average power level. As described below in more detail, in one embodiment, a threshold value of a ratio of peak power level-to-average power level is selected, with the threshold value being sufficient to distinguish optical signal from optical noise. The threshold peak power level data can be stored 380 in a memory available to the receiver. As shown in the flow chart of FIG. 3C, during an operational phase, the peak power level and average power level may be measured 385 and a signal detected 390 by the signal detector 250 if the measured peak power is greater than the value of the threshold peak power level.

Figure 4:
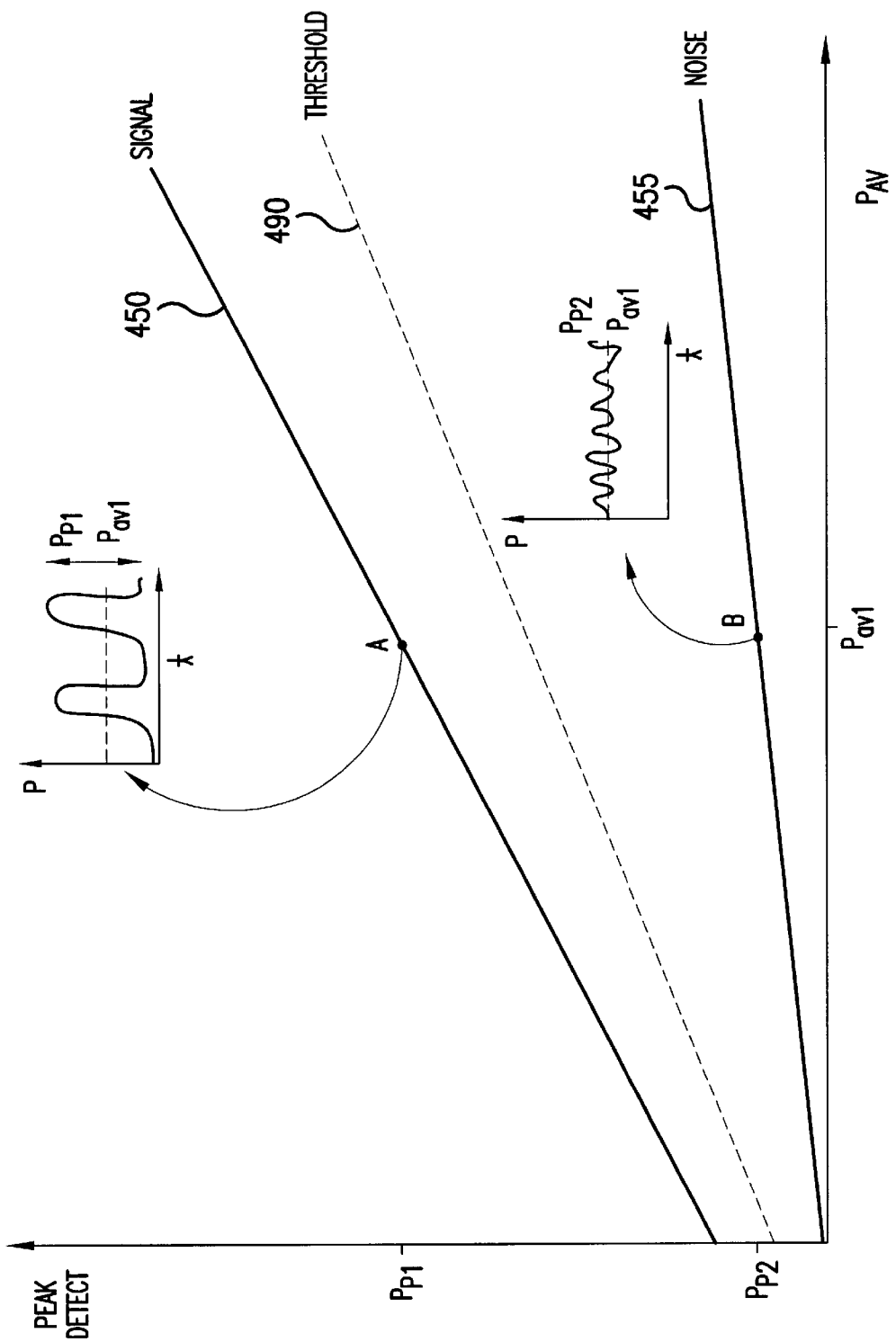
FIG. 4 is an illustrative graph showing plots of the optical characteristics of an optical signal and optical noise.

FIG. 4 shows two illustrative plots of peak power level versus average power level for a signal plot 450 and a noise plot 455. Signal plot 450 corresponds to the received peak power level plotted against the average power level for a simulated data stream of optical data pulses that is amplified by an optical amplifier in an upstream node. Noise plot 455 corresponds to a measurement of the peak power level versus average power level for optical noise generated by an optical amplifier in an upstream node for a loss of signal condition. Optical data pulses have a higher ratio of peak-power-to-average power than optical noise. At each measured average power level, signal plot 450 has a larger peak power level than noise plot 455. As show in FIG. 4, at an average power level $P_{av1}$, signal plot 450 has a peak power level at point "A" with a peak power level $P_{p1}$. At the same average power level, noise plot 455 has a peak power level at point "B" of $P_{p2}$, with $P_{p2} < P_{p1}$. This behavior is a result of the different characteristics in the time domain for an optical data signal compared with optical noise for a loss-of-signal condition. In the time domain, optical noise for a loss-of-signal condition will have statistical deviations around an average power level that are determined by well-known statistical laws that depend upon the physical properties of the optical amplifier. Typically, only comparatively small deviations about an average power level are statistically likely for optical noise. Thus, the ratio of the peak power level to average power level will be comparatively low for the optical noise associated with a loss-of-signal condition. However, the function of an optical amplifier receiving a data stream is to create an output having a comparatively large increase in the amplitude of an optical data pulse relative to a baseline level. Thus, the value of the peak power level relative with respect to the average power level is comparatively high for an optical data signal. This difference in the optical characteristics of optical data signals and optical noise can be used to provide a reliable signal detection function even over a range of attenuation of the optical path link that results in a substantial variation in the peak optical power level at the optical detector.

In one embodiment, the peak power level to distinguish an optical data signal from optical noise is adjusted appropriately for the optical attenuation of the optical path link using the information of the average power level. In another embodiment, the ratio of peak power level to average power level is used to distinguish an optical data signal from optical noise. Referring to FIG. 4, a consequence of the difference in statistical behavior of optical data signals and optical noise is that for each average power level a threshold peak power value may be selected that is less than the value of the peak power level for an optical data signal but still greater than the peak power level for noise at the same average power level with a sufficient margin to distinguish an optical data signal from optical noise for a loss-of-signal condition. As indicated by dashed line 490, one method to establish a threshold peak power level at each average power level is to select a line 490 in between signal plot 450 and noise plot 455. Line 490 preferably corresponds to a line in which the peak power level is above the peak power level for noise plot 455 but below the peak power level for signal plot 450 with a sufficient margin to distinguish an optical data signal from optical noise. As one example, line 490 may have a value of the peak power level that is the average of signal plot 450 and noise plot 455 at each average power level. As another example, line 490 could have a peak power level at each average power level that is a preselected percentage (e.g., 80%) of the peak power level of signal plot 450. Alternately, line 490 could have a peak power level at each average power level that is a preselected percentage (e.g., 20%) above the peak power level of noise plot 455. As still another example, line 490 could have a slope that is a pre-selected percentage of the slope of signal plot 450. In one embodiment, the slope of line 490 is used to define a threshold value of the ratio of the peak power level-to-average power level sufficient to distinguish an optical data signal from optical noise. In this embodiment, if the measured ratio of peak power level—to average power level is greater than the threshold value, a signal is detected. It will also be understood that while line 490 is shown as a continuous line, it will also be understood that line 490 may be stepwise continuous, i.e., be incremented in steps such that the threshold peak power level is incremented at least once over the range of optical attenuation of the optical path link.

Figure 5:
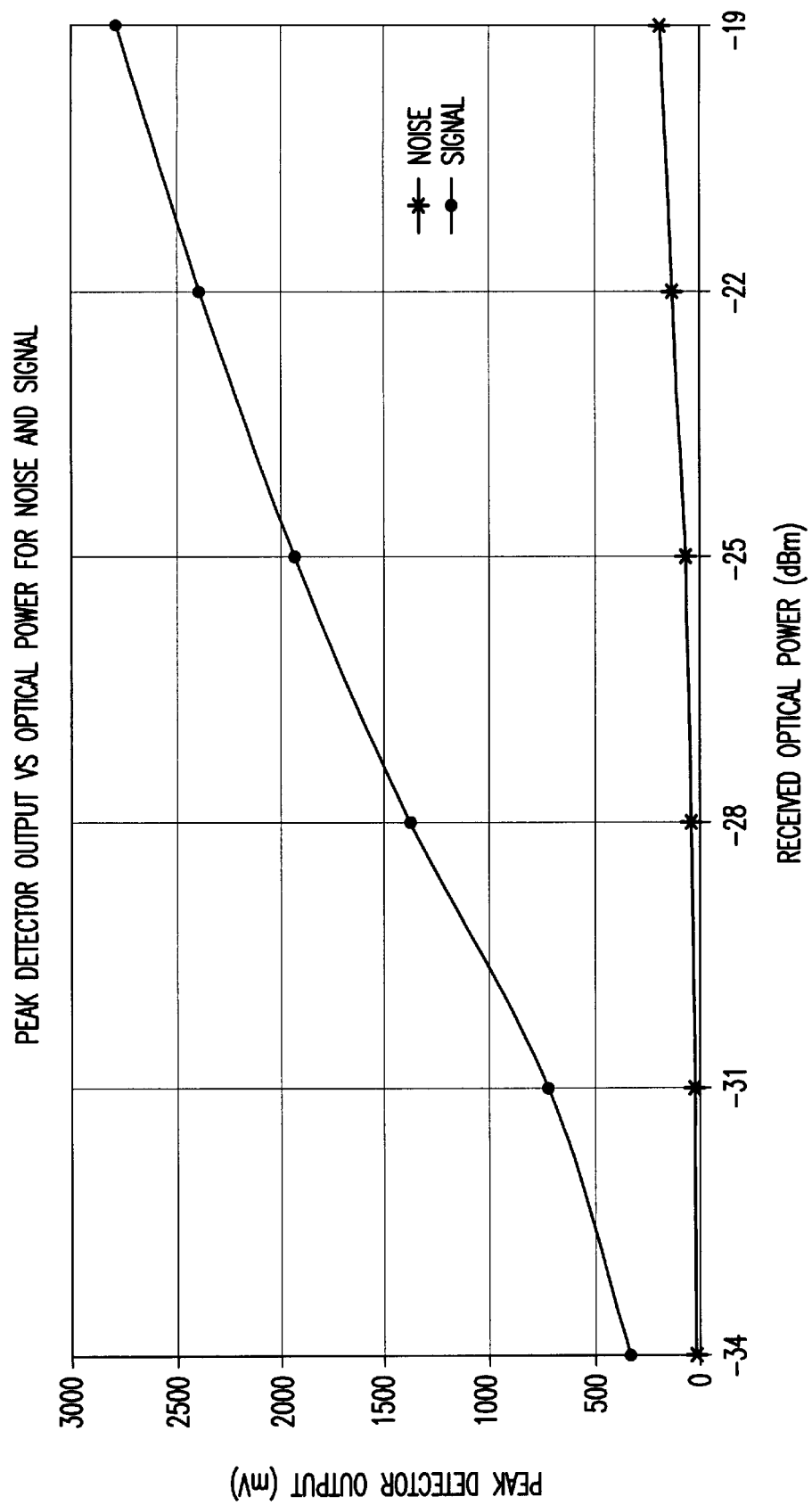
FIG. 5 is a graph of the measured optical characteristics of an optical signal and optical noise using an apparatus similar to that of FIG. 3A.

As indicated by the experimental plots of FIG. 5, plots of peak detector output voltage versus received optical power (dBm) are approximately linear such that the threshold peak power level may be approximated as a straight line. In one experimental test with an erbium doped fiber amplifier, the peak power level for the optical signal was typically 8–9 dB higher than for optical noise at each average power level.

Figure 6:
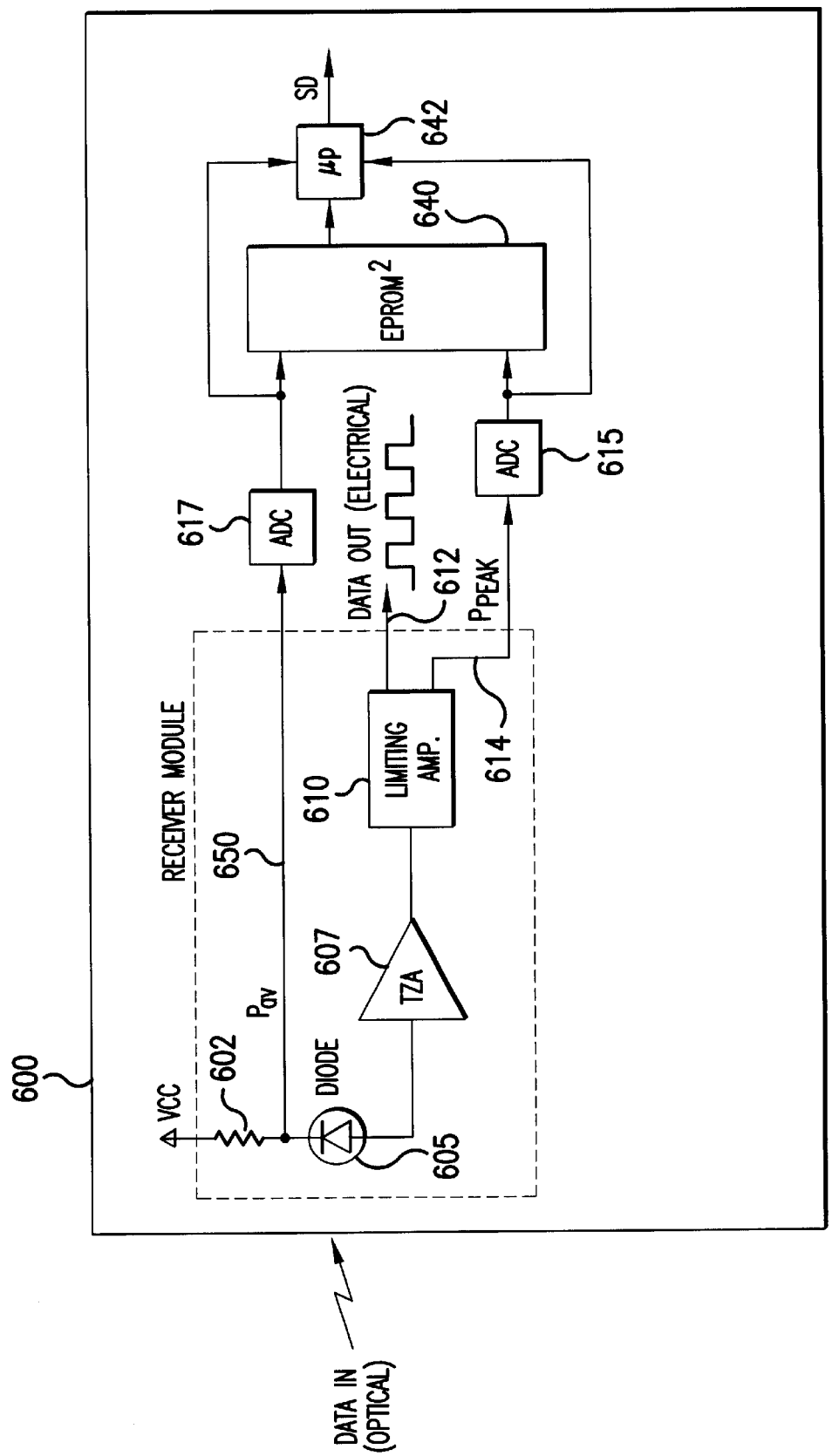
FIG. 6 is a block diagram of an optical receiver for practicing the method of the present invention.

FIG. 6 shows one embodiment of an optical receiver 600 having an optical detection circuit for practicing the method of the present invention. A photodiode 605 has two electrical output terminals. One output terminal is coupled to an electrical trans-impedance amplifier 607. A limiting amplifier 610 receives the output of amplifier 607 and has a bit data output 612 and a peak detect output 614. An analog-to-digital controller (ADC) 615 may be used to record the peak-detect output 614 (which corresponds to a signal indicative of the peak power level) measured during a calibration test onto a memory 640 (e.g., an EEPROM). The output of ADC 615 is also coupled to microprocessor controller 642. A measurement of a photocurrent (which corresponds to a measurement of a signal indicative of the average power level) 650 is measured from a resistor 602 coupled to one of the electrical terminals of photodiode 605. An ADC 617 is used to record the average power level 650 during a calibration test onto memory 640.

During normal operation of optical receiver 600, microprocessor controller 642 receives the signals from ADC controllers 615 and 617 and compares it with the calibration data recorded on memory 640, preferably on a quasi-continuous or scheduled basis consistent with the fault detection requirements of the optical network. Microprocessor controller 642 outputs a SD signal if it determines that the measured peak power level exceeds the peak power level associated with optical noise at the measured average power level. In one embodiment, microprocessor controller 642 determines the ratio of peak power level-to-average power level and outputs a SD signal if the ratio is significantly greater than the ratio for optical noise.

Figure 7:
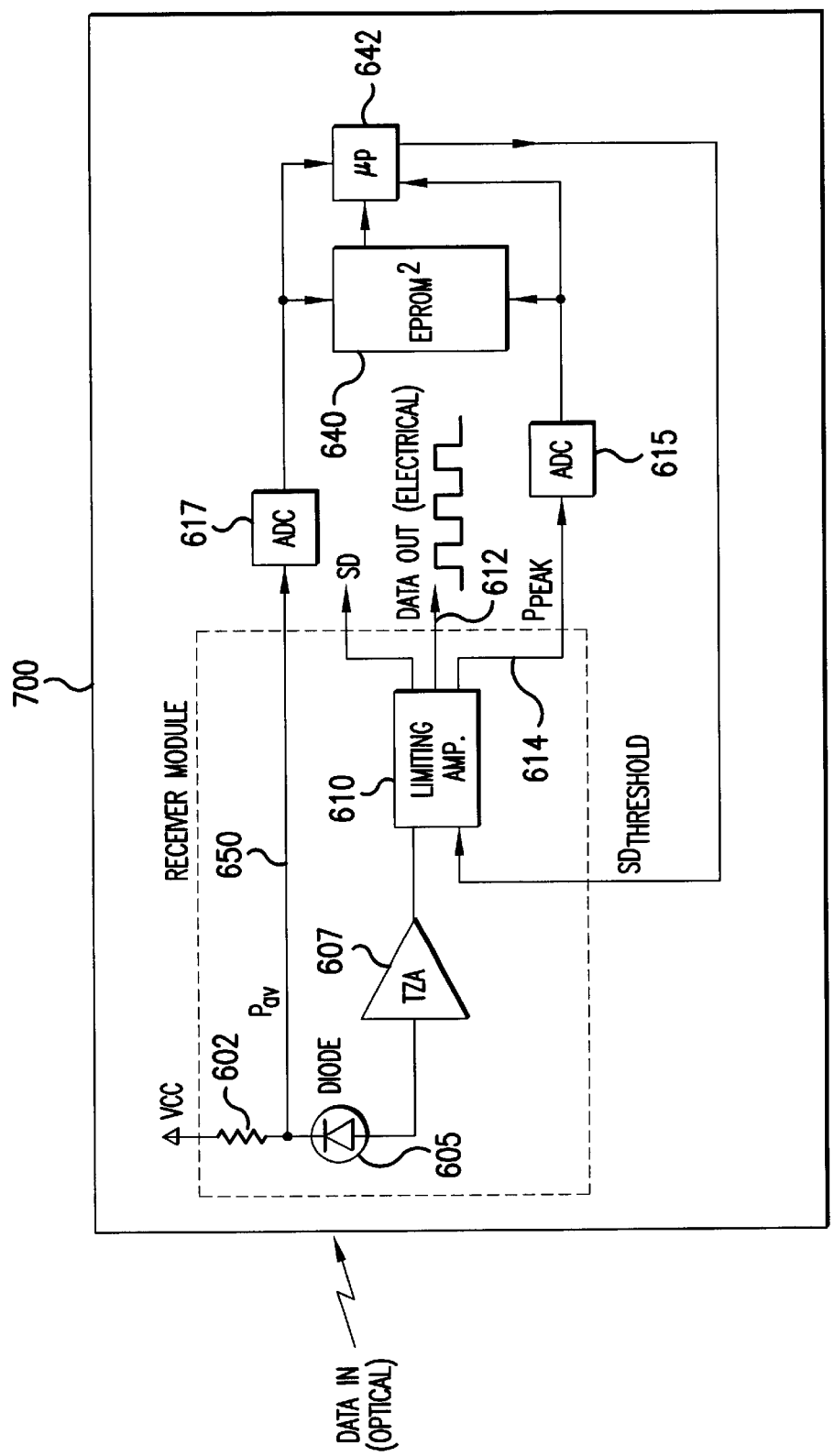
FIG. 7 is a block diagram of an optical receiver for practicing the method of the present invention.

It will also be understood that an optical detection circuit for practicing the method of the present invention may include a controller adapting the signal detect threshold of a conventional signal detect circuit. Some commercially available limiting amplifiers include a signal detection function in which a SD signal is generated if the peak-detect power is greater than a fixed signal detect threshold value $SD_{threshold}$. As shown in FIG. 7, in one embodiment of a receiver 700, a microprocessor controller 642 may determine an appropriate threshold peak-detect power level for the average power level. The microprocessor controller 642 then selects the value of the signal detect threshold power level ($SD_{threshold}$) input of limiting amplifier 610, with the SD output coming from the limiting amplifier 610.

One benefit of an optical detection circuit in accord with the present invention is that the threshold peak power level automatically adapts to changes in the attenuation of optical path links. The signal detect function is thus reliable and robust to changes in network design or operation which may change the effective attenuation of an optical path link.

One optical network application that benefits from the method of the present invention is in an optical network in which the length of an optical fiber between two nodes may be sufficiently large to require forward error correction techniques. Forward error correction (FEC) is a well-known technique to add additional error correction bits prior to the transmission of a data packet. An encoder is included at the transmitter to encode the error correction bits. A decoder at the receiver permits errors in the bit data detected by the receiver to be corrected, thereby improving the BER for a particular signal-to-noise ratio at the receiver. FEC permits a reduction in the minimum received signal power needed to achieve a desired BER.

Figure 8:
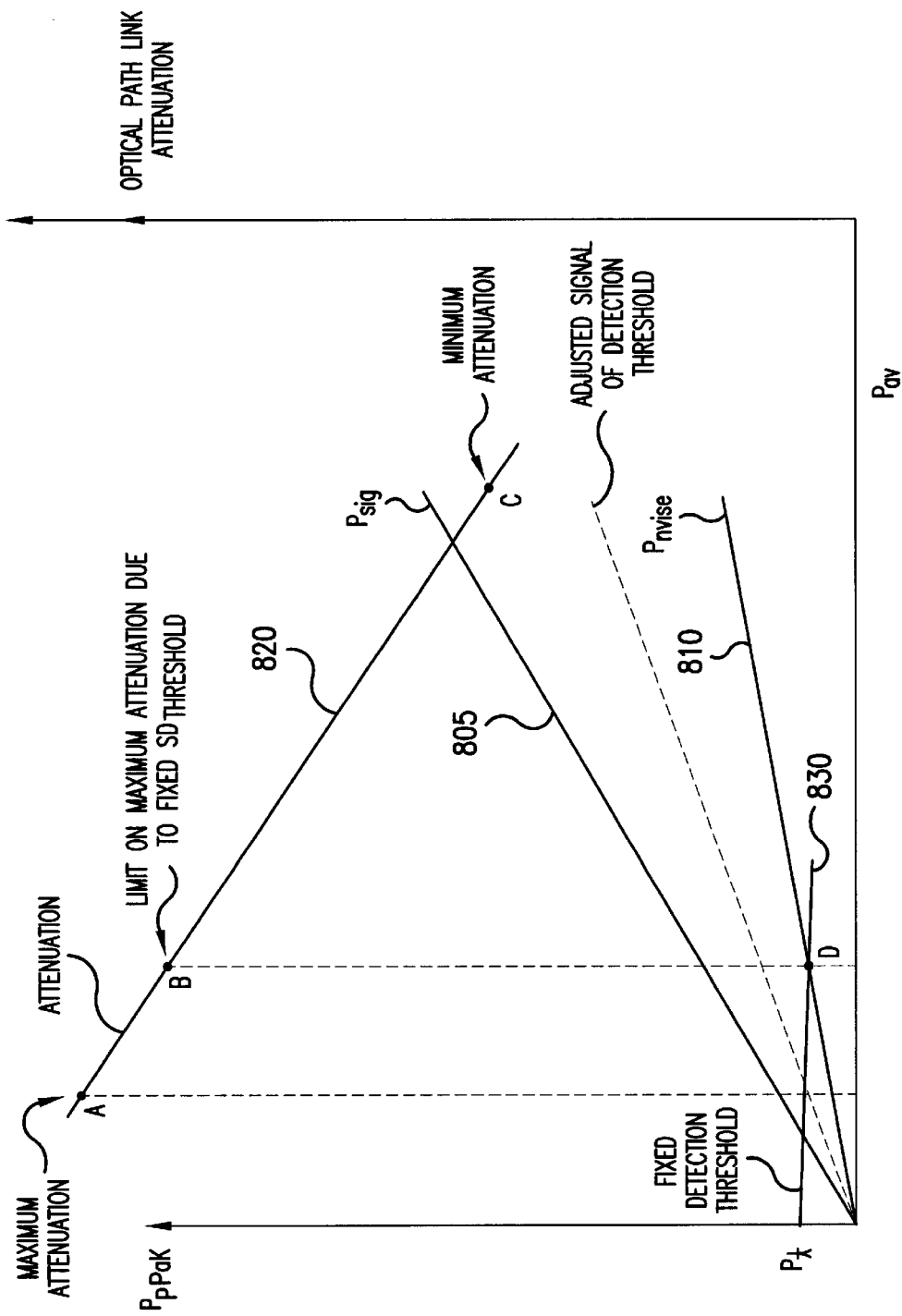
FIG. 8 is a diagram illustrating how the present invention may be beneficially applied to optical networks to achieve a reliable signal detection function over a wide range of optical path link attenuation.

FIG. 8 illustrates some of the constraints on optical path link distances in an optical network with FEC. Line 805 corresponds to a plot of the peak power level of signal versus average power level. Line 810 corresponds to a plot of the peak power level of optical noise versus average power level. Additionally, line 820 corresponds to a plot of optical path link attenuation versus average power level. As illustrated in FIG. 8, FEC permits an increase in the maximum optical path link attenuation (e.g., an increase in the maximum optical fiber length of the optical path link) permitted to achieve a desired minimum BER, as indicated by point "A" of line 820. As an illustrative example, FEC may permit a reduction in received power level from −32 dBm to −36 dBm. However, if a conventional SD technique is used, the threshold peak power level for signal detection must be fixed to be below the peak power level at the maximum optical path link attenuation, i.e. to be below −36 dBm in the illustrative example. As indicated by line 830, this imposes an undesirable limitation on the minimum optical path link attenuation (e.g., the minimum fiber length of the optical path link), since the optical noise at the minimum optical path link attenuation must be below the threshold peak power level for signal detection, as indicated by point "B" of line 820 and point "D" of line 830. Below the minimum attenuation, further reductions in attenuation would result in the optical noise exceeding the peak detect threshold (which must be fixed comparatively low to permit detection of a signal at the maximum optical path link distance). This would result in a conventional signal detection circuit erroneously determining that there was a signal even if a LOS (loss of signal) condition occurred. Consequently, using a conventional signal detection technique the range of attenuation is limited to a range between the attenuation of point A and point B. By way of contrast, the method of the present invention automatically adapts the signal detect threshold so that the signal detect threshold is above the optical noise level for a loss of signal condition over a wide range of optical path link attenuation. Point "C" of line 820 indicates a point of minimum desired optical path link attenuation. The instant invention permits a reliable signal detect function to be achieved over a range of optical path link attenuation between point A and point C of line 820, which corresponds to a wide range of optical fiber length. Consequently, the present invention permits an optical network to fully exploit the benefits of FEC encoding over a wide range of optical fiber lengths.

While the present invention has been discussed in detail in regards to an optical detection circuit residing in an optical receiver, it will be understood that the optical detection circuit does not have to be part of an optical receiver for recovering the data stream. In particular, the optical detection circuit of the present invention may be used in an optical node to provide a monitoring function for one or more optical data channels in an optical node.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In an optical network with an optical detection circuit residing on a first optical node, a second upstream optical node having an optical amplifier generating optical noise adapted to amplify an optical data stream, and an optical path link coupling the optical detection circuit in the first node and an output of the optical amplifier of the second node, the optical path link having an optical attenuation with a range of attenuation between a minimum attenuation and a maximum attenuation, a method of selecting a signal detection threshold for an optical input received by the optical detection circuit appropriate for the optical attenuation of the optical path link, the method comprising:

receiving a first signal indicative of an average power level of the optical input;

receiving a second signal indicative of a peak power level of the optical input; and selecting the signal detection threshold to distinguish an optical signal condition from a loss of signal condition appropriate for the optical attenuation of the optical path link, the signal detection threshold selected to have an associated threshold power level that is greater than a peak power level for an optical input composed of optical noise having the average power level and less than a peak power level for an optical input composed of optical data pulses having the average power level;

the signal detection circuit operable for the range of attenuation of the optical path link being sufficiently large that the threshold power level is adjusted at least once over the range of attenuation.

2. The method of claim 1, further comprising: generating an output signal having a first value responsive to the peak power level of the optical input being greater than the threshold power level and a second value responsive to the peak power level of the optical input being less than the threshold power level.

3. The method of claim 2, further comprising:

characterizing an average power level and a peak power level of simulated optical noise over the range of attenuation; and characterizing an average power level and a peak power level of test optical data pulses over the range of attenuation.

4. The method of claim 3, wherein the peak power level of the optical noise at the minimum attenuation is at least as large as the peak power level of the optical data pulses at the maximum attenuation.

5. The method of claim 1, wherein the peak power level of the optical noise at the minimum attenuation is at least as great as the peak power level of the optical data pulses at the maximum attenuation.

6. The method of claim 1, further comprising:

in a test mode, coupling an optical test amplifier and an optical attenuator having an adjustable attenuation between the optical detection circuit and an optical test transmitter;

in the test mode, characterizing a peak power level and an average power level of optical test pulses received by the optical detection circuit over the range of attenuation;

in the test mode, characterizing a peak power level and the average power level of optical noise received by the optical detection circuit from the optical test amplifier over the range of attenuation; and in an operational mode, selecting the threshold power level for each average power level using characterization data collected during the test mode.

7. The method of claim 1, further comprising:

responsive to the peak power level of the optical input being greater than the threshold power level, outputting a first signal indicative of a signal detect condition; and responsive to the peak power level of the optical input being less than the threshold power level, outputting a second signal indicative of a loss-of-signal condition.

8. The method of claim 1, wherein the signal detection threshold is a threshold ratio of the peak power level to the average power level, the method further comprising:

calculating a ratio of the peak power level to the average power level; and generating an output signal having a first value responsive to the ratio being greater than the signal detection threshold and a second value responsive to the ratio being less than the signal detection threshold.

9. In an optical network with an optical detection circuit residing on a first optical node, a second upstream optical node having an optical amplifier adapted to amplify an optical data stream, and an optical path link coupling the optical detection circuit in the first node and an output of the optical amplifier of the second node, the optical path link having an optical attenuation within a range of attenuation between a minimum attenuation and a maximum attenuation, a method of adjusting a signal detection threshold for an optical input received by the optical detection circuit, the method comprising:

receiving a signal indicative of an average power level of the optical input; and selecting a threshold power level appropriate for the optical attenuation of optical path link, the threshold power level being greater than a peak power level of optical noise for a loss-of-signal condition at the average power level and the threshold power level being less than a peak power level for an optical signal condition at the average power level;

the signal detection circuit operable for the range of attenuation of the optical path link being sufficiently large that the threshold power level is adjusted at least once over the range of attenuation.

10. The method of claim 9, further comprising:

receiving a second signal indicative of a peak power level of the optical input; and generating an output signal having a first value responsive to the peak power level of the optical input being greater than the threshold power level and a second value responsive to the peak power level of the optical input being less than the threshold power level.

11. The method of claim 9, further comprising:

characterizing an average power level and a peak power level of optical noise over the range of attenuation; and characterizing an average power level and a peak power level of simulated optical data pulses over the range of attenuation.

12. The method of claim 11 wherein the peak power level of optical noise at the minimum attenuation is at least as large as the peak power level of optical data pulses at the maximum attenuation.

13. The method of claim 9 wherein the peak power level of optical noise at the minimum attenuation is at least as large as the peak power level of optical data pulses at the maximum attenuation.

14. The method of claim 9, further comprising:

in a test mode, coupling a variable attenuator between the optical detection circuit and an optical test transmitter with at least one optical amplifier disposed between the optical detection circuit and the optical test transmitter;

in the test mode, measuring a peak power level and an average power level of optical pulses received by the optical detection circuit over a range of optical attenuation that may be encountered in the optical network;

in the test mode, measuring a peak power level and an average power level of optical noise received by the optical detection circuit over the range of optical attenuation with the optical test transmitter in a quiescent state; and selecting the threshold power level for each average power level using data collected during the test mode.

15. In an optical network with an optical detection circuit residing on a first optical node, a second upstream optical node having an optical amplifier arranged to amplify an optical data stream, and an optical path link coupling the optical detection circuit in the first node and an output of the optical amplifier of the second node, the optical path link having an optical attenuation having a range of attenuation between a minimum attenuation and a maximum attenuation, a method of detecting a data signal, the method comprising:

for each average power level over a range of average power levels, selecting a threshold power level greater than a peak power level of optical noise at the average power level and less than a peak optical power level of optical data pulses at the average power level;

receiving a signal indicative of a measured average power level of an optical input received by the optical detection circuit;

receiving a signal indicative of a measured peak power level of the optical input;

determining the threshold power level appropriate for the measured average power level;

responsive to the measured peak power level being greater than the threshold power level, outputting a first signal having a value indicative of a signal detect condition; and responsive to the peak power level being less than the threshold power level, outputting a second signal having a value indicative of a loss-of-signal condition;

the signal detection circuit operable for the range of attenuation of the optical path link being sufficiently large that the threshold power level is adjusted at least once over the range of attenuation.

16. The method of claim 15, wherein the peak power level of optical noise at the minm attenuation is at least as large as the peak power level of optical data pulses at the maximum attenuation.

17. The method of claim 16, wherein the optical data pulses are encoded with a forward error correction code.

18. The method of claim 14, further comprising:

characterizing the average power level and the peak power level of optical noise over the range of attenuation; and characterizing the average power level and the peak power level of simulated optical data pulses over the range of attenuation.

19. The method of claim 18, wherein the peak power level of optical noise at the minimum attenuation is at least as large as the peak power level of optical data pulses at the maximum attenuation.

20. The method of claim 19, wherein the data pulses are encoded with a forward error correction code.

21. In an optical network with an optical detection circuit residing on a first optical node, a second upstream optical node having an optical amplifier arranged to amplify an optical data stream, and an optical path link coupling the optical detection circuit in the first node and an output of the optical amplifier of the second node, the optical path link having an optical attenuation within a range of attenuation between a minimum attenuation and a maximum attenuation, a method of adjust a threshold level for detecting a signal, the method comprising:

characterizing a peak power level and an average power level of optical data pulses received by the optical detection circuit over the range of attenuation;

characterizing a peak power level and an average power level of optical noise received by the optical detection circuit for a loss of signal condition over the range of attenuation;

measuring an average power level of an optical input to the optical detection circuit;

measuring a peak power level of the optical input; and selecting a signal detection threshold sufficient to distinguish a data signal from optical noise for the optical attenuation of the optical path link associated with the measured average power level;

the range of attenuation being sufficiently large that the peak power level of optical noise at the minimum attenuation is at least as great as optical data pulses at the maximum attenuation.

22. The method of claim 21, wherein the signal detection threshold is a threshold peak power level, the method further comprising:

generating an output signal having a first value responsive to the measured peak power level of the optical input being greater than signal detection threshold and a second value responsive to the measured peak power level being less than the signal detection threshold.

23. The method of claim 22, wherein the signal detection threshold is a threshold ratio of the peak power level to the average power level, the method further comprising:

calculating a ratio of the measured peak power level to the measured average power level; and generating an output signal having a first value responsive to the ratio being greater than the signal detection threshold and a second value responsive to the ratio being less than the signal detection threshold.

24. In an optical network with an optical detection circuit residing on a first optical node, a second optical node having an optical amplifier arranged to amplify an optical data stream, and an optical path link coupling the nodes having an optical attenuation having a range of attenuation between a minimum attenuation and a maximum attenuation, a method of adapting a signal detect threshold to maintain the signal detect threshold above the power level of the optical noise over the range of attenuation, the method comprising:

characterizing a peak power level and an average power level of the optical noise over the range of attenuation;

detecting a signal indicative of a measured peak optical power level of an optical input to the optical detector;

detecting a signal indicative of a measured average optical power level of the optical input; and selecting a signal detection threshold corresponding to a threshold peak optical power level being greater than the peak power level of the optical noise at the measured average power level;

the signal detection circuit operable for the range of attenuation of the optical path link being sufficiently large that the threshold peak optical power level is adjusted at least once over the range of attenuation.

25. The method of claim 24, further comprising:

responsive to the measured peak power level being greater than the signal detection threshold, outputting a first signal indicative of a signal detect condition; and responsive to the measured peak power level being less than the threshold level, outputting a second signal indicative of a loss-of-signal condition.

26. In an optical network with an optical detection circuit residing on a first optical node, a second upstream optical node having an optical amplifier arranged to amplify an optical data stream, and an optical path link coupling the optical detection circuit in the first node and an output of the optical amplifier of the second node, the optical path link having an optical attenuation within a range of attenuation between a minimum attenuation and a maximum attenuation, a method of detecting a data signal for an optical input received by the optical detection circuit, the method comprising:

receiving a first signal indicative of an average power level of the optical input;

receiving a second signal indicative of a peak power level of the optical input;

calculating a ratio of the peak power level to the average power level; and generating an output signal having a first value responsive to the ratio being greater than a threshold value and a second value responsive to the ratio being less than the threshold value;

the threshold value selected to be greater than a ratio of a peak power level to an average power level for optical noise and less than the ratio of a peak power level to an average power level for optical data pulses.

27. The method of claim 26, further comprising:

characterizing an average power level and a peak power level of optical noise over the range of attenuation; and characterizing an average power level and a peak power level of test optical data pulses over the range of attenuation.

28. The method of claim 27, wherein the peak power level of optical noise at the minimum attenuation is at least as large as the peak power level of optical data pulses at the maximum attenuation.

29. The method of claim 28, wherein the data pulses are encoded with a forward error correction code.

30. The method of claim 26, further comprising:

in a test mode, coupling a variable attenuator between the optical detection circuit and an optical test transmitter with at least one optical amplifier disposed between the optical detection circuit and the optical test transmitter;

in the test mode, characterizing a peak power level and an average power level of optical test pulses received by the optical detection circuit over the range of attenuation;

in the test mode, characterizing the peak power level and the average power level of optical noise received by the optical detection circuit over the range of attenuation; and selecting the threshold value using characterization data collected during the test mode.

31. In an optical network with an optical detection circuit residing on a first optical node, a second upstream optical node having an optical amplifier adapted to receive an optical data stream and output an amplified data stream, and an optical path link having an optical fiber coupling the optical detection circuit in the first node and an output of the optical amplifier of the second node, a method of signal detection, the method comprising:

selecting a range of optical attenuation for the optical path link between a minimum attenuation and a maximum attenuation;

characterizing a peak power level and an average power level of optical data pulses over the range of attenuation;

characterizing a peak power level and an average power level of optical noise over the range of attenuation; and selecting a threshold value of a ratio of peak power level to average power level sufficient to distinguish the optical data pulses from the optical noise over the range of attenuation;

wherein the peak power level of optical noise at the minimum attenuation is at least as great as optical data pulses at the maximum attenuation.

32. The method of claim 31, further comprising:

in an operational mode of the optical network, measuring the peak power level and the average power level of an optical input;

calculating a ratio of the measured peak power level to the average power level; and generating an output signal having a first value responsive to the ratio being than the threshold value and a second value responsive to the ratio being less than the threshold value.

33. In an optical network, a method of selecting a signal detection threshold for an optical input received by an optical detection circuit residing on a receiving node, the method comprising:

selecting an optical path from a transmitter on a first node to the optical detection circuit of the receiving node, the optical path including an optical amplifier residing on a node upstream of the receiving node coupled to the optical detection circuit of the receiving node by an optical path link having an optical fiber;

receiving a first signal indicative of an average power level of an optical input to the optical detection circuit;

receiving a second signal indicative of a peak power level of the optical input; and selecting a signal detection threshold to distinguish an optical signal condition from a loss of signal condition appropriate for the optical attenuation of the optical path link, the signal detection threshold selected to have an associated threshold power level that is greater than a peak power level for an optical input composed of optical noise having the average power level and less than a peak power level for an optical input composed of optical data pulses having the average power level;

the signal detection circuit operable for a range of attenuation of the optical path link being sufficiently large that the threshold power level is adjusted at least once over the range of attenuation.

34. The method of claim 33, further comprising: generating an output signal having a first value responsive to the peak power level of the optical input being greater than the threshold power level and a second value responsive to the peak power level of the optical input being less than the threshold power level.

35. The method of claim 34, further comprising:

characterizing an average power level and a peak power level of simulated optical noise over the range of attenuation; and characterizing an average power level and a peak power level of test optical data pulses over the range of attenuation.

36. The method of claim 35, wherein the peak power level of the optical noise at the minimum attenuation is at least as large as the peak power level of the optical data pulses at the maximum attenuation.

37. The method of claim 33, wherein the peak power level of the optical noise at the minimum attenuation is at least as great as the peak power level of the optical data pulses at the maximum attenuation.

38. The method of claim 33, further comprising:

in a test mode, coupling an optical test amplifier and an optical attenuator having an adjustable attenuation between the optical detection circuit and an optical test transmitter;

in the test mode, characterizing a peak power level and an average power level of optical test pulses received by the optical detection circuit over the range of attenuation;

in the test mode, characterizing a peak power level and the average power level of optical noise received by the optical detection circuit from the optical test amplifier over the range of attenuation; and in an operational mode, selecting the threshold power level for each average power level using characterization data collected during the test mode.

39. The method of claim 33, further comprising:

responsive to the peak power level of the optical input being greater than the threshold power level, outputting a first signal indicative of a signal detect condition; and responsive to the peak power level of the optical input being less than the threshold power level, outputting a second signal indicative of a loss-of-signal condition.

40. The method of claim 33, wherein the signal detection threshold is a threshold ratio of the peak power level to the average power level, the method further comprising:

calculating a ratio of the peak power level to the average power level; and generating an output signal having a first value responsive to the ratio being greater than the signal detection threshold and a second value responsive to the ratio being less than the signal detection threshold.

41. In an optical network with an optical detection circuit residing on a first optical node, a second upstream optical node having an optical amplifier generating optical noise adapted to amplify an optical data stream, and an optical path link including an optical fiber coupling an output of the optical amplifier of the second node to an optical input of the optical detection circuit in the first node, a method of detecting a signal, the method comprising:

selecting a range of optical attenuation of the optical path link between a minimum attenuation and a maximum attenuation, the optical attenuation decreasing the optical input received by the optical detector, the range of attenuation being sufficiently great that a peak power level of the optical input at the minimum attenuation for a loss-of-signal condition is at least as great as a peak power level of the optical input for an optical signal condition at the maximum attenuation;

characterizing optical power characteristics of the optical input over the range of attenuation for the optical signal condition;

characterizing optical power characteristics of the optical input over the range of attenuation for the loss-of-signal condition;

selecting an optical power characteristic of the optical input sufficient to distinguish a time domain behavior associated with optical noise for the loss-of-signal condition from a time domain behavior associated with optical data pulses for the signal condition;

measuring the optical power characteristic; and responsive to a measured value of the optical characteristic being greater than the threshold value, detecting a signal; and responsive to the measured value of the optical power characteristic being less than the threshold value, detecting a loss-of-signal.

42. The method of claim 41, wherein the optical power characteristic is a ratio of a peak power level to an average power level.

43. The method of claim 41, wherein the optical characteristics is a ratio of a peak-detect voltage to a photocurrent.

44. In an optical network with an optical detection circuit residing on a first optical node, a second upstream optical node having an optical amplifier generating optical noise adapted to amplify an optical data stream, and an optical path link including an optical fiber coupling an optical input of the optical detection circuit in the first node and an output of the optical amplifier of the second node, the optical path link having an optical, a method of detecting a signal, the method comprising:

determining a relationship between a peak power level and an average power of the optical input sufficient to distinguish an optical signal condition from a loss-of-signal condition over a range of attenuation of the optical path link between a minimum attenuation and a maximum attenuation;

receiving a first signal indicative of the peak power level of the optical input;

receiving a second signal indicative of the average power level of the optical input;

detecting a signal responsive to the peak power level and the average power level having values relative to each other indicative of a signal condition; and detecting a loss-of-signal responsive to the peak power level and average power having values relative to each other indicative of a loss-of-signal condition.

45. An optical detection circuit for a node of an optical network receiving an optical signal from an optical amplifier of an upstream optical node coupled to the node by an optical path link, the optical detection circuit comprising:
- an optical detector generating at least one electrical output responsive to an optical input received by the optical detector;
- an electrical circuit coupled to the at least one electrical output of the optical detector configured to provide a first signal indicative of a peak optical power level of the optical input and a second signal indicative of an average optical power level of the optical input; and
- a signal detector receiving the signals of the electrical circuit configured to select a a signal detection threshold having a threshold peak optical power level sufficient to distinguish an optical signal input from an optical amplifier noise input at the average power level, the signal detector adapted to adjust the threshold peak optical power level at least once over a range of optical attenuation of the optical path link that includes a minimum attenuation and a maximum attenuation.

46. The optical detection circuit of claim 45, wherein the peak power level of optical noise at the minimum attenuation is at least as great as the peak power level of an optical data signal at the maximum attenuation.

47. The optical detection circuit of claim 45, wherein the signal detector outputs a first value responsive to the peak power level being greater than the threshold power level and a second value responsive to the peak power level being less than the threshold power level.

48. The optical detection circuit of claim 45, wherein the optical detector includes a microprocessor controller and a memory coupled to the microprocessor controller.

49. The optical detection circuit of claim 48, wherein the signal detector is configured to record characterization data in the memory of peak power level and average power level of optical noise and peak power level and average power level of optical data pulses over the range of attenuation.

50. The optical detection circuit of claim 45, wherein the signal detector calculates a threshold ratio of peak power level to average power level sufficient to distinguish an optical signal input from an optical amplifier noise input.

51. The optical detection circuit of claim 50, wherein the signal detector calculates a ratio of peak power level to average power level and outputs a first value responsive to the ratio being greater than the threshold ratio and a second value responsive to the ratio being less than the threshold ratio.

52. An optical network, comprising:
- a first node having an optical amplifier for amplifying an optical data stream of optical data pulses;
- a second node;
- an optical path link coupling the first node to the second node having at least one optical fiber; and
- and an optical detection circuit coupled to the second node, the optical detection circuit including:
  - an optical detector generating at least one electrical output responsive to an optical input received by the optical detector;
  - an electrical amplifier circuit coupled to the at least one electrical output of the optical detector configured to measure a peak optical power level and an average optical power level of the optical input; and
  - a signal detector receiving the signals of the electrical circuit configured to select a signal detection threshold having a threshold peak optical power level sufficient to distinguish an optical signal input from an optical amplifier noise input at the average power level, the signal detector adapted to adjust the threshold peak optical power level at least once over a range of optical attenuation of the optical path link that includes a minimum attenuation and a maximum attenuation.

53. The optical detection circuit of claim 52, wherein the peak power level of optical noise at the minimum attenuation is at least as great as the peak power level of an optical data signal at the maximum attenuation.

54. The optical network of claim 52, wherein the signal detector outputs a first value responsive to the peak power level being greater than the threshold power level and a second value responsive to the peak power level being less than the threshold power level.

55. The optical network of claim 52, wherein the optical detector includes a microprocessor controller and a memory coupled to the microprocessor controller.

56. The optical network of claim 55, wherein the signal detector is configured to record characterization data in the memory of peak power level and average power level of optical noise and peak power level and average power level of optical data pulses over the range of attenuation.

57. The optical detection circuit of claim 52, wherein the signal detector calculates a threshold ratio of peak power level to average power level sufficient to distinguish an optical signal input from an optical amplifier noise input.

58. The optical detection circuit of claim 57, wherein the signal detector calculates a ratio of peak power level to average power level and outputs a first value responsive to the ratio being greater than the threshold ratio and a second value responsive to the ratio being less than the threshold ratio.

59. An optical network, comprising:
- a first node having an optical amplifier receiving an optical data stream and having an output coupled to an output port of the optical amplifier;
- a second node having an input port;
- an optical fiber coupling the output port of the first node to the input port of the second node, the optical fiber having an optical attenuation that depends upon the length of the optical fiber; and
- an optical detection circuit residing in the second node receiving an optical input coupled by the input port of the second node, the optical detection circuit including:
  - an optical detector coupled to an electrical circuit adapted to measure signals indicative of a peak optical power level and an average optical power level of the optical input; and
  - a signal detector receiving the signals of the electrical circuit configured to select a signal detection threshold having a threshold peak optical power level sufficient to distinguish an optical signal input from an optical amplifier noise input at the average power level;
  - the signal detector adapted to adjust the threshold peak optical power level at least once over a range of length of the optical fiber having a minimum attenuation at a minimum length and a maximum attenuation at a maximum length with the peak power level of the optical amplifier noise input at the minimum attenuation being at least as great as the peak power level of the optical signal input at the maximum attenuation.

60. An optical detection circuit for an optical node coupled to an output of an optical amplifier in an upstream optical node by an optical path link including an optical fiber, the optical path link having an optical attenuation, comprising:

optical detector means for receiving an input optical signal from the upstream optical amplifier and outputting a first signal indicative of an average optical power level and a second signal indicative of a peak optical power level; and signal detector means receiving the first and second signals and selecting a signal detection threshold corresponding to a threshold peak power level at the average power level sufficient to distinguish an optical data signal from optical noise for the optical attenuation of the optical path link over a range of attenuation in which the threshold peak power level is adjusted at least once.

\* \* \* \* \*